UNITED STATES PATENT OFFICE

1,990,610

VULCANIZATION ACCELERATOR

Helmuth Meis, Leverkusen-Wiesdorf, Germany, assignor to I. G. Farbenindustrie Aktiengesellschaft, Frankfort-on-the-Main, Germany No Drawing. Application September 1, 1933, Serial No. 687,917. In Germany September 9, 1932

6 Claims. (Cl. 18—53)

The present invention relates to new vulcanization accelerators, to a process of vulcanizing rubber and to the new vulcanizates obtainable by said process.

When reacting upon the reaction products of phosphorous trichloride with a secondary amine with carbon bisulfide, additional products of the latter compound with the former are obtained, which have been found to be valuable vulcanization accelerators for the vulcanization of natural rubber and artificial rubber-like masses.

I am not aware of the exact constitution of said compounds, but it is to be presumed that one or two molecular proportions of carbon bisulfide have combined with the reaction product of phosphorous trichloride and a secondary amine. They may therefore be represented by the formula:

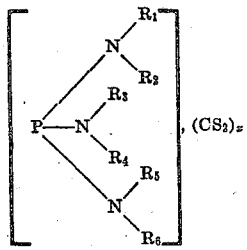

The formation of the new accelerators takes place already when simply adding carbon bisulfide to a tertiary phosphine amine of the formula given above or vice versa. The presence of an indifferent organic solvent is advantageous during the reaction. The compounds thus obtainable possess very valuable accelerating properties, in many cases they even have the character of ultra-accelerators. For vulcanization purposes they may be used alone or in admixture with other accelerators. The probable constitution of the new compounds has been given above, whereby in the formula

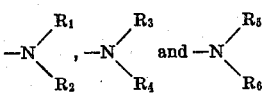

are to be understood as meaning radicals of secondary amines, $x$ denotes one of the numbers 1 or 2 and $R_1$ to $R_6$ stand for substituted or unsubstituted hydrocarbon groups, such as alkyl groups, aryl groups, aralkyl groups, hydroaryl groups etc. $R_1$ and $R_2$, $R_3$ and $R_4$, $R_5$ and $R_6$ may also stand for a chain of alkylene groups, which may be interrupted by hetero atoms, such as sulfur or oxygen.

The following examples illustrate the invention, without, however, restricting it thereto, the parts being by weight:—

Example 1

A mixture was prepared from:—

|  | Parts |
|---|---|
| Light crepe | 50 |
| Smoked sheets | 50 |
| Titan dioxide | 15 |
| Heavy spar (finely ground) | 10 |
| Sulfur | 3.5 |
| Stearic acid | 1 |
| Accelerator | 0.45 |

As accelerators were applied:—
(1) tri-(dimethylamino)-phosphine+$CS_2$
(2) tripiperidylphosphine+$CS_2$;
(3) tripiperidylphosphine+$2CS_2$;

When vulcanizing the mixtures the following values were obtained:—

| Heating 0.5 atm. (superatmospheric) | Tensile strength in kg/cm² | | | Stretch in percent | | |
|---|---|---|---|---|---|---|
| | 1 | 2 | 3 | 1 | 2 | 3 |
| 30 minutes | 225 | 242 | 239 | 715 | 780 | 772 |
| 50 minutes | 229 | 240 | 216 | 693 | 728 | 695 |
| 80 minutes | 223 | 231 | 188 | 686 | 702 | 645 |
| 120 minutes | 216 | 210 | 168 | 683 | 675 | 622 |
| 1.5 atm. (superatm.) | | | | | | |
| 15 minutes | 210 | 231 | 204 | 692 | 768 | 725 |
| 25 minutes | 219 | 237 | 234 | 705 | 745 | 742 |
| 33 minutes | 210 | 242 | 205 | 702 | 745 | 705 |
| 45 minutes | 204 | 233 | 187 | 705 | 733 | 680 |
| 60 minutes | 189 | 207 | 165 | 696 | 712 | 675 |

Example 2

A vulcanization mixture was prepared from:—

|  | Parts |
|---|---|
| Light crepe | 100 |
| Sulfur | 1 |
| Zinc oxide active | 0.8 |
| Stearic acid | 0.8 |
| Accelerator | 0.375 |

As accelerators were applied:—
(1) the addition product of 1 mol. of $CS_2$ to 1 mol. of tripiperidylphosphine
(2) the same accelerator +1 part of hexamethylene tetramine.

When vulcanizing the mixture, the following figures were obtained:—

| Heating 1 atm. (superatm.) | Tensile strength in kg/cm² | | Stretch in percent | |
|---|---|---|---|---|
| | 1 | 2 | 1 | 2 |
| 10 minutes | 174 | 160 | 974 | 1,026 |
| 20 minutes | 185 | 195 | 997 | 984 |
| 30 minutes | 174 | 214 | 1,025 | 981 |
| 45 minutes | 156 | 204 | 1,060 | 973 |

Instead of the $CS_2$ addition products mentioned in the above examples, substitution products thereof or addition products of $CS_2$ to phosphine amines containing the radicals of different secondary amines may be applied, such as the additional products of $CS_2$ to monopiperidyl-di-(diethylamino)-phosphine, monopiperidyl-di-(ethylmethylamino)-phosphine, dipiperidyl - mono- (dimethylamino)-phosphine, tripipecolyl-phosphine, tri - (para - nitro - methylphenylamino) - phosphine and so on.

Likewise, in the above examples the natural rubber may be partly or totally replaced by artificial rubber-like masses as are obtainable, for example, by polymerizing a butadiene hydrocarbon, such as butadiene, isoprene or dimethylbutadiene alone or in admixture with one another or with other polymerizable compounds, such as styrene, vinylnaphthalene, acrylic acid esters or -nitriles, unsaturated ketones, etc.

Therefore, when using in the claims the term "rubber", the same is intended to include as well natural rubber as artificial rubber-like masses like those disclosed above.

I claim:—

1. The process which comprises vulcanizing rubber in the presence of and in contact with a compound of the probable formula:—

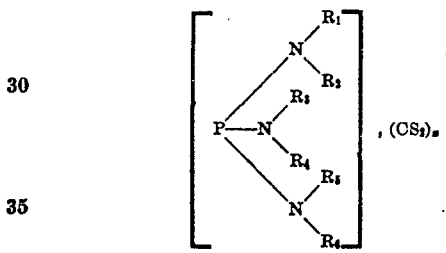

wherein

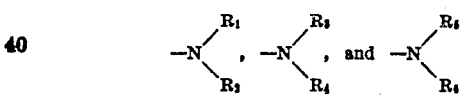

stand for radicals of secondary amines, and $x$ means one of the numbers 1 or two.

2. The process which comprises vulcanizing rubber in the presence of and in contact with a compound of the probable formula:—

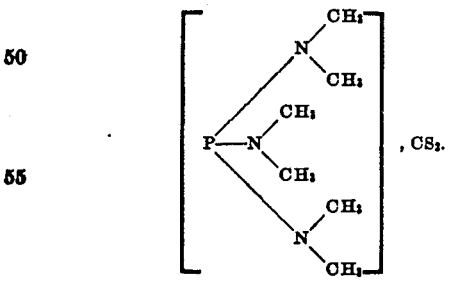

3. The process which comprises vulcanizing rubber in the presence of and in contact with a compound of the probable formula:—

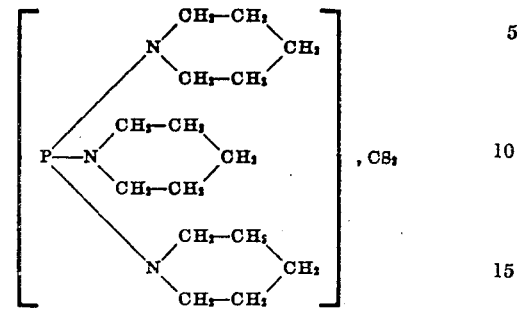

4. The process which comprises vulcanizing rubber in the presence of and in contact with a compound of the probable formula:—

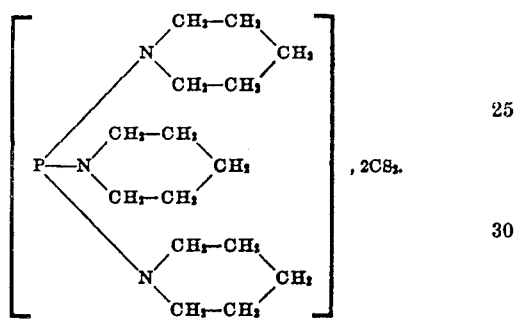

5. Vulcanization accelerator comprising a compound of the probable formula:—

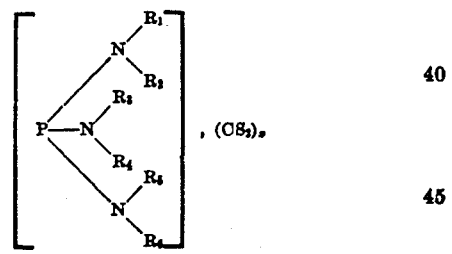

wherein

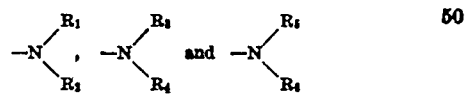

stand for radicals of secondary amines, and $x$ means one of the numbers one or two.

6. The vulcanizates obtained according to the process as claimed in claim 1.

HELMUTH MEIS.